(12) United States Patent
Lacroix

(10) Patent No.: US 7,049,006 B2
(45) Date of Patent: May 23, 2006

(54) MULTILAYER STRUCTURE BASED ON POLYAMIDES AND ON A TIE LAYER MADE OF A COPOLYAMIDE BLEND

(75) Inventor: Christophe Lacroix, Harquency (FR)

(73) Assignee: Arkema, Puteaux (FR)

( * ) Notice: Subject to any disclaimer, the term of this patent is extended or adjusted under 35 U.S.C. 154(b) by 0 days.

(21) Appl. No.: 10/978,408

(22) Filed: Nov. 2, 2004

(65) Prior Publication Data

US 2005/0112390 A1     May 26, 2005

Related U.S. Application Data

(63) Continuation of application No. 10/353,094, filed on Jan. 29, 2003, now abandoned.

(60) Provisional application No. 60/358,388, filed on Feb. 22, 2002.

(30) Foreign Application Priority Data

Jan. 29, 2002    (FR)    .................................... 0201039

(51) Int. Cl.
  *C08L 77/00*    (2006.01)
  *B32B 27/34*    (2006.01)

(52) U.S. Cl. ................ 428/474.7; 252/500; 428/474.9; 428/475.8; 525/432

(58) Field of Classification Search ................ 525/432; 428/474.7, 474.9, 475.8; 252/500
See application file for complete search history.

(56) References Cited

U.S. PATENT DOCUMENTS 4,487,895 A * 12/1984 Feldmann et al. .......... 525/432
4,661,585 A *  4/1987 Feldmann et al. .......... 525/432

* cited by examiner

*Primary Examiner*—Ana Woodward
(74) *Attorney, Agent, or Firm*—Millen White Zelano & Branigan, P.C.

(57) ABSTRACT

A multilayer structure based on polyamides, comprising:
  a first layer (1) formed from a polyamide $P_1$ or from a blend of a polyamide $P_1$ and a polyolefin $PO_1$ having a $P_1$ polyamide matrix,
  optionally, a layer (2*a*) formed from EVOH;
  a layer (2) formed from a blend of PA-6/12 copolyamides, one comprising by weight more 6 than 12 and the other more 12 than 6;
  a layer (3) formed from a polyamide $P_3$, it being possible for $P_1$ and $P_3$ to be identical or different, the layers (1), (2), (2*a*) and (3) being successive and adhering to one another in their respective contact regions.

20 Claims, No Drawings

MULTILAYER STRUCTURE BASED ON POLYAMIDES AND ON A TIE LAYER MADE OF A COPOLYAMIDE BLEND

This application is a continuation of U.S. patent application Ser. No. 10/353,094 filed Jan. 29, 2003, now abandoned which claimed benefit of the filing date of U.S. Provisional Application Ser. No. 60/358,388, filed Feb. 22, 2002.

FIELD OF THE INVENTION

The present invention relates to structures based on polyamides and on a tie layer made of a copolyamide blend. They comprise a polyamide layer, a layer made of a copolyamide blend and another polyamide layer. It is particularly useful when one of the polyamide layers is made of PA-12 and the other polyamide layer is made of PA-6 or based on PA-6. These structures may include other layers, for example a layer of EVOH (an ethylene/vinyl alcohol copolymer). These structures are useful for making tanks, containers, bottles, multilayer films, tubes and pipes. They may be manufactured by blow coextrusion. The advantage of these structures is that they are a barrier to many substances. One particularly useful use relates to tubes for transporting petrol and in particular for taking petrol from the tank to the engine of a motor vehicle.

For safety and environmental protection reasons, motor-vehicle manufacturers require these tubes to have both mechanical properties such as strength and flexibility with good cold (−40° C.) impact strength as well as good high-temperature (125° C.) strength, and also very low permeability to hydrocarbons and to their additives, particularly alcohols such as methanol and ethanol. These tubes must also have good resistance to the fuels and lubrication oils for the engine. These tubes are manufactured by coextruding the various layers using standard techniques for thermoplastics.

PRIOR ART AND TECHNICAL PROBLEM

Among the characteristics of the specification for these tubes, five are particularly difficult to obtain jointly in a simple manner:
cold (−40° C.) impact strength—the tube does not break;
fuel resistance;
high-temperature (125° C.) strength;
very low permeability to petrol;
good dimensional stability of the tube in use with the petrol.

In multilayer tubes of various structures, the cold impact strength remains unpredictable before having carried out the standardized tests for cold impact strength.

Moreover, it is already known from Patent Application EP 0 781 799 that in motor vehicles, owing to the effect of the injection pump, the petrol flows at high speed in the pipes connecting the engine to the tank. In certain cases, friction between the petrol and the internal wall of the tube can generate electrostatic charges, the build-up of which may result in an electrical discharge (a spark) capable of igniting the petrol with catastrophic consequences (an explosion). It is therefore necessary to limit the surface resistivity of the internal face of the tube to a value of generally less than $10^6$ ohms/square. It is known to lower the surface resistivity of polymeric resins or materials by incorporating conductive and/or semiconductive materials into them, such as carbon black, steel fibres, carbon fibres, and particles (fibres, platelets or spheres) metallized with gold, silver or nickel.

Among these materials, carbon black is more particularly used, for economic and processability reasons. Apart from its particular electrically conductive properties, carbon black behaves as a filler such as, for example, talc, chalk or kaolin. Thus, those skilled in the art know that when the filler content increases, the viscosity of the polymer/filler blend increases. Likewise, when the filler content increases, the flexural modulus of the filled polymer increases. These known and predictable phenomena are explained in "Handbook of Fillers and Reinforcements for Plastics", edited by H. S. Katz and J. V. Milewski—Van Nostrand Reinhold Company—ISBN 0-442-25372-9, see in particular Chapter 2, Section II for fillers in general and Chapter 16, Section VI for carbon black in particular.

As regards the electrical properties of carbon black, the technical report "Ketjenblack EC—BLACK 94/01" by Akzo Nobel indicates that the resistivity of the formulation drops very suddenly when a critical carbon black content, called the percolation threshold, is reached. When the carbon black content increases further, the resistivity rapidly decreases until reaching a stable level (plateau region). It is therefore preferred, for a given resin, to operate in the plateau region in which a metering error will have only a slight effect on the resistivity of the compound.

Polyamide- and EVOH-based tubes for transporting petrol are also known from Patent Application EP 0 731 308. These tubes may have a four-layer structure comprising, respectively, a PA-12 outer layer, a tie layer, which is a grafted polyolefin, an EVOH layer and an inner layer in contact with the petrol, comprising a blend of a polyamide and a polyolefin having a polyamide matrix.

Patent EP 428 833 discloses a three-layer tube comprising, respectively, a PA-12 outer layer, a tie layer which is a grafted polyolefin and an EVOH inner layer in contact with the petrol.

Patents EP 428 834 and EP 477 606 disclose a five-layer tube comprising, respectively, a PA-12 outer layer, a tie layer which is a grafted polyolefin, a PA-6 layer, an EVOH layer and a PA-6 inner layer in contact with the petrol.

Patent U.S. Pat. No. 5,038,833 discloses a three-layer tube comprising, respectively, a PA-12 outer layer, an EVOH layer and a PA-12 inner layer in contact with the petrol.

Patent EP 1 036 968 discloses a multilayer tube based on polyamides, characterized in that it comprises, in its radial direction from the inside outwards:
a first layer formed from a blend of a polyamide $P_1$ and a polyolefin $PO_1$ having a $P_1$ polyamide matrix or else a first layer formed from a polyamide $P_1$;
optionally, an EVOH layer;
a layer formed from a copolyamide;
a layer formed from a polyamide $P_3$;

it being possible for $P_1$ and $P_3$ to be identical or different, the layers being successive and adhering to one another in their respective contact regions.

In the description, it is stated that the copolyamide of the copolyamide layer is advantageously a coPA-6/12, that is to say a copolymer of caprolactam and lauryllactam, the proportions by weight of caprolactam to lauryllactam possibly varying in the ratio of 20/80 to 80/20. It is also stated that this copolyamide layer may also be a salt of hexamethylenediamine with a dicarboxylic acid having from 6 to 12 carbon atoms. The term <<copolyamide>> is not correct, nevertheless PA-6,6 (hexamethylene adipamide), PA-6,9, PA-6,10 and PA-6,12 (hexamethylene dodecanamide) are disclosed for example.

Patent EP 1 162 061 discloses a multilayer tube consisting of the following layers, going from the inside to the outside of the tube:
- a layer based on PA-6;
- an EVOH layer;
- a layer consisting either of a PA-6/12 copolyamide having from 55 to 80% by weight of caprolactam or a PA-6,10 or PA-6,12 polyamide or a blend of PA-6 and of PA-12;
- a PA-12 layer.

These two multilayer tubes have useful properties, however, it has been discovered that, in this type of structure, if the layer lying between the EVOH layer and the outer layer is a blend of PA-6/12 copolyamides, one being predominantly PA-6 and the other predominantly PA-12, then the properties are excellent. This copolyamide blend is also very efficient in the structure described in patent EP 1 036 968, even when there is no EVOH layer.

BRIEF DESCRIPTION OF THE INVENTION

The present invention relates to a multilayer structure based on polyamides, comprising:
- a first layer (1) formed from a polyamide $P_1$ or else from a blend of a polyamide $P_1$ and a polyolefin $PO_1$ having a $P_1$ polyamide matrix,
- optionally, a layer (2a) formed from EVOH;
- a layer (2) formed from a blend of PA-6/12 copolyamides, one comprising by weight more 6 than 12 and the other more 12 than 6;
- a layer (3) formed from a polyamide $P_3$, it being possible for $P_1$ and $P_3$ to be identical or different, the layers (1), (2), (2a) and (3) being successive and adhering to one another in their respective contact regions.

According to a variant of the structure of the invention, the first layer (1) is replaced with another layer (1a), this other layer (1a) being formed either from a polyamide $P_1a$ or a blend of a polyamide $P_1a$ and a polyolefin $PO_1a$ having a polyamide matrix and containing electrically conducting carbon black producing a surface resistivity of less than $10^6$ $\Omega/\square$.

According to another variant, the structure of the invention comprises an additional layer (1a) placed on the layer (1) side, the layers (1) and (1a) adhering to each other in their respective contact region, this other layer (1a) being formed either from a polyamide $P_1a$ or a blend of a polyamide $P_1a$ and a polyolefin $PO_1a$ having a polyamide matrix and containing electrically conducting carbon black producing a surface resistivity of less than $10^6$ $\Omega/\square$.

Advantageously, in the above structures the polyamide $P_1$ or $P_1a$ is chosen from nylon-6, nylon-6,6 and nylon-12, and preferably PA-6.

Advantageously, in the above structures the polyolefin $PO_1$ or $PO_1a$ is chosen from:
- polyethylene;
- polypropylene;
- ethylene/alpha-olefin copolymers;
- ethylene/alkyl (meth)acrylate copolymers;
- ethylene/alkyl (meth)acrylate/maleic anhydride copolymers, the maleic anhydride being grafted or copolymerized;
- ethylene/alkyl (meth)acrylate/glycidyl methacrylate copolymers, the glycidyl methacrylate being grafted or copolymerized.

Advantageously in the above structures, the polyamide $P_3$ is chosen from PA-11 and PA-12 and is preferably PA-12.

The structures of the invention may be in the form of tubes in which the layer (1) or (1a) is on the inside and the layer (3) on the outside. They are useful as tubes for transporting petrol. These tubes may be manufactured by coextrusion.

The present invention also relates to the use of the copolyamide blends of the layer (2) as compatibilizers for polyamide blends, particularly blends comprising PA-12 and at least one polyamide chosen from PA-6 and PA-6,6. It also relates to these blends by themselves.

DETAILED DESCRIPTION OF THE INVENTION

With regard to the polyamide $P_1$ or $P_1a$ matrix of the layer 1 or 1a, it is possible to use any polyamide.

The term <<polyamide>> is understood to mean products resulting from the condensation:
- of one or more amino acids, such as aminocaproic, 7-aminoheptanoic, 11-aminoundecanoic and 12-amino-dodecanoic acids, or of one or more lactams, such as caprolactam, oenantholactam and lauryllactam;
- of one or more salts or mixtures of diamines, such as hexamethylenediamine, dodecamethylenediamine, metaxylylenediamine, bis-p-(aminocyclohexyl)methane and trimethylhexamethylenediamine, with diacids, such as isophthalic, terephthalic, adipic, azelaic, suberic, sebacic and dodecanedicarboxylic acids;

or mixtures of several of these monomers, which results in copolyamides.

Aliphatic diamines are α,ω-diamines containing, between the amino terminal groups, at least 6 carbon atoms, preferably 6 to 10 carbon atoms. The carbon chain may be linear (polymethylenediamine) or branched or even cycloaliphatic. Preferred diamines are hexamethylenediamine (HMDA), dodecamethylenediamine and decamethylenediamine.

The dicarboxylic acids may be aliphatic, cycloaliphatic or aromatic. The aliphatic dicarboxylic acids are α,ω-dicarboxylic acids having at least 4, preferably at least 6, carbon atoms (excluding the carbon atoms of the carboxylic groups) in the linear or branched carbon chain. The diacids are azelaic, sebacic and 1,12-dodecanoic acids. As an illustration of such PAs, mention may be made of:
- polyhexamethylene sebacamide (PA-6,10),
- polyhexamethylene dodecanediamide (PA-6,12),
- poly(undecanoamide) (PA-11),
- poly(lauryllactam) (2-azacyclotridecanone) (PA-12),
- polydodecamethylene dodecanediamide (PA-12,12),
- polycapronamide (PA-6),
- polyhexamethylene adipamide (PA-6,6).

The PAs have a number-average molecular mass $\overline{M}_n$ generally greater than or equal to 5000. Their inherent viscosity (measured at 20° C.) for a 0.5 g sample in 100 g of meta-cresol) is in general greater than 0.7.

It is possible to use polyamide blends. Advantageously, PA-6 and PA-6,6 and PA-12 are used.

With regard to the polyolefins of layer (1) or (1a), polyolefins are understood to mean polymers comprising olefin units such as, for example, the units: ethylene, propylene, 1-butene and their higher homologues.

By way of example, mention may be made of:
- polyethylene, polypropylene, copolymers of ethylene with alpha-olefins. These products may be grafted with unsaturated carboxylic acid anhydrides such as maleic anhydride or unsaturated epoxides such as glycidyl methacrylate;

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their half-esters and their anhydrides and (iv) unsaturated expoxides. These ethylene copolymers may be grafted with unsaturated dicarboxylic acid anhydrides or unsaturated epoxides;

styrene/ethylene-butylene/styrene block copolymers (SEBS), these possibly being maleicized.

It is possible to use blends of two or more of these polyolefins.

Advantageously, the following are used:
polyethylene;
polypropylene;
copolymers of ethylene with an alpha-olefin;
ethylene/alkyl (meth)acrylate copolymers;
ethylene/alkyl (meth)acrylate/maleic anhydride copolymers, the maleic anhydride being grafted or copolymerized;
ethylene/alkyl (meth)acrylate/glycidyl methacrylate copolymers, the glycidyl methacrylate being grafted or copolymerized.

It is recommended, in order to facilitate the formation of the polyamide matrix, and if the polyolefins have few or no functional groups able to facilitate the compatibilization, to add a compatibilizer.

The compatibilizer is a product known per se for compatibilizing polyamides and polyolefins.

Mention may be made, for example, of:
polyethylene, polypropylene, ethylene-propylene copolymers, ethylene-butylene copolymers, all these products being grafted with maleic anhydride or with glycidyl methacrylate;
ethylene/alkyl (meth)acrylate/maleic anhydride copolymers, the maleic anhydride being grafted or copolymerized;
ethylene/vinyl acetate/maleic anhydride copolymers, the maleic anhydride being grafted or copolymerized;
the above two copolymers in which the maleic anhydride is replaced with glycidyl methacrylate;
ethylene/(meth)acrylic acid copolymers, and possibly their salts;
polyethylene, polypropylene or ethylene/propylene copolymers, these polymers being grafted with a product having a reactive site with amines; these grafted copolymers then being condensed with polyamides or polyamide oligomers having a single amine end group.

These products are described in Patents FR 2 291 225 and EP 342 066, the contents of which are incorporated by reference in the present application.

The amount of polyamide forming the matrix in the inner layer may be between 50 and 95 parts per 5 to 50 parts of polyolefins.

The amount of compatibilizer is the amount sufficient for the polyolefin to be dispersed in the form of nodules in the polyamide matrix. It may represent up to 20% of the weight of the polyolefin. These polymers of the inner layer are manufactured by blending the polyamide, the polyolefin and possibly the compatibilizer using standard techniques for melt blending (twin-screw, Buss, single-screw extruders).

These polyamide/polyolefin blends of layer 1 or 1a may be plasticized and possibly contain fillers such as carbon black, which allows this layer to be made antistatic or electrically conductive.

According to the advantageous embodiment of the invention, the amount of polyamide of layer 1 or 1a is between 50 and 75 parts per 100 parts of the polyamide/polyolefin blend.

Preferred embodiments of the polyamide/polyolefin blends will now be described. These blends may be used in the inner layer, optionally with conducting black and/or used without conducting black.

According to a first preferred embodiment of the invention, the polyolefin comprises (i) a high-density polyethylene (HDPE) and (ii) a blend of a polyethylene (C1) and a polymer (C2) chosen from elastomers, very low-density polyethylenes and ethylene copolymers, the (C1)+(C2) blend being cografted with an unsaturated carboxylic acid.

According to a second preferred embodiment of the invention, the polyolefin comprises (i) polypropylene and (ii) a polyolefin which results from the reaction of a polyamide (C4) with a copolymer (C3) comprising propylene and an unsaturated monomer X, which is grafted or copolymerized.

According to a third preferred embodiment of the invention, the polyolefin comprises (i) a polyethylene of the LLDPE, VLDPE or metallocene type and (ii) an ethylene/alkyl (meth)acrylate/maleic anhydride copolymer.

With regard to the first embodiment, the proportions (by weight) are advantageously the following:
60 to 70% of polyamide,
5 to 15% of the cografted blend of (C1) and (C2),
the balance being high-density polyethylene.

With regard to the high-density polyethylene, its density is advantageously between 0.940 and 0.965 and the MFI between 0.1 and 5 g/10 min. (190° C./2.16 kg).

The polyethylene (C1) may be chosen from the above-mentioned polyethylenes. Advantageously, (C1) is a high-density polyethylene (HDPE) having a density between 0.940 and 0.965. The MFI of (C1) is between 0.1 and 3 g/10 min. (190° C./2.16 kg).

The copolymer (C2) may, for example, be an ethylene/propylene elastomer (EPR) or ethylene/propylene/diene elastomer (EPDM). (C2) may also be a very low-density polyethylene (VLDPE) which is either an ethylene homopolymer or an ethylene/alpha-olefin copolymer. (C2) may also be a copolymer of ethylene with at least one product chosen from (i) unsaturated carboxylic acids, their salts and their esters, (ii) vinyl esters of saturated carboxylic acids and (iii) unsaturated dicarboxylic acids, their salts, their esters, their half-esters and their anhydrides. Advantageously (C2) is an EPR.

Advantageously, 60 to 95 parts of (C1) per 40 to 5 parts of (C2) are used.

The blend of (C1) and (C2) is grafted with an unsaturated carboxylic acid, that is to say (C1) and (C2) are cografted. It would not be outside the scope of the invention to use a functional derivative of this acid. Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids.

Unsaturated dicarboxylic acids having 4 to 10 carbon atoms and their functional derivatives, particularly their anhydrides, are particularly preferred grafting monomers. These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicylco[2.2.1]hept-5-ene-2,2-dicarboxylic anhydrides. Advantageously maleic anhydride is used.

Various known processes can be used to graft a grafting monomer onto the blend of (C1) and (C2). For example, this may be achieved by heating the polymers (C1) and (C2) to a high temperature, about 150° C. to about 300° C., in the presence or absence of a solvent and with or without a radical initiator.

In the graft-modified blend of (C1) and (C2) obtained in the abovementioned manner, the amount of grafting monomer may be chosen appropriately, but it is preferably from 0.01 to 10% and better still from 600 ppm to 2%, with respect to the weight of grafted (C1) and (C2). The amount of grafted monomer is determined by assaying the succinic functional groups by FTIR spectroscopy. The MFI (190° C./2.16 kg) of the cografted (C1) and (C2) is 5 to 30 and preferably 13 to 20 g/10 min.

Advantageously, the cografted (C1)/(C2) blend is such that the $MFI_{10}/MFI_2$ ratio is greater than 18.5, $MFI_{10}$ denoting the melt flow index at 190° C. with a load of 10 kg and $MFI_2$ denoting the melt flow index with a load of 2.16 kg. Advantageously, the $MFI_{20}$ of the blend of the cografted polymers (C1) and (C2) is less than 24. $MFI_{20}$ denotes the melt flow index at 190° C. with a load of 21.6 kg.

With regard to the second embodiment of the invention, the proportions (by weight) are advantageously the following:
60 to 70% of polyamide,
20 to 30% of polypropylene,
3 to 10% of a polyolefin which results from the reaction of a polyamide (C4) with a copolymer (C3) comprising propylene and an unsaturated monomer X, grafted or copolymerized.

The MFI (230° C./2.16 kg) of the polypropylene is advantageously less than 0.5 g/10 min and preferably between 0.1 and 0.5 g/10 min. Such products are described in EP 647681.

The grafted product of this second embodiment of the invention will now be described. Firstly, (C3) is prepared, this being either a copolymer of propylene and an unsaturated monomer X, or a polypropylene onto which an unsaturated monomer X is grafted. X is any unsaturated monomer that can be copolymerized with propylene or grafted onto the polypropylene and having a functional group capable of reacting with a polyamide. This functional group may, for example, be a carboxylic acid, a dicarboxylic acid anhydride or an epoxide. As examples of monomer X, mention may be made of (meth)acrylic acid, maleic anhydride and unsaturated epoxides such as glycidyl (meth)acrylate. Advantageously, maleic anhydride is used. With regard to the grafted polypropylenes, X may be grafted onto propylene homopolymers or copolymers, such as ethylene/propylene copolymers consisting predominantly (in moles) of propylene. Advantageously, (C3) is such that X is grafted. The grafting is an operation known per se.

(C4) is a polyamide or a polyamide oligomer. Polyamide oligomers are described in EP 342066 and FR 2291225. The polyamides (or oligomers) (C4) are products resulting from the condensation of the abovementioned monomers. Polyamide blends may be used. It is advantageous to use PA-6, PA-11, PA-12, a copolyamide having PA-6 units and PA-12 units (PA-6/12) and a copolyamide based on caprolactam, hexamethylenediamine and adipic acid (PA-6/6,6). The polyamides or oligomers (C4) may have acid, amine or monoamine terminal groups. In order for the polyamide to have a monoamine terminal group, all that is required is to use a chain stopper of formula:

in which:
$R_1$ is hydrogen or a linear or branched alkyl group containing up to 20 carbon atoms;
$R_2$ is a linear or branched, alkyl or alkenyl, group having up to 20 carbon atoms, a saturated or unsaturated cycloaliphatic radical, an aromatic radical or a combination of the above. The chain stopper may, for example, be laurylamine or oleylamine.

Advantageously, (C4) is a PA-6, a PA-11 or a PA-12. The proportion by weight of C4 in C3+C4 is advantageously between 0.1 and 60%. The reaction of (C3) with (C4) preferably takes place in the melt state. For example, it is possible to mix (C3) and (C4) in an extruder at a temperature generally between 230 and 250° C. The average residence time of the melt in the extruder may be between 10 seconds and 3 minutes and preferably between 1 and 2 minutes.

With regard to the third embodiment, the proportions (by weight) are advantageously the following:
60 to 70% of polyamide,
5 to 15% of an ethylene/alkyl (meth)acrylate/maleic anhydride copolymer,
the balance being a polyethylene of the LLDPE, VLDPE or metallocene type; advantageously the density of this polyethylene is between 0.870 and 0.925, and the MFI is between 0.1 et 5 g/10 min. (190° C./2.16 kg).

Advantageously, the ethylene/alkyl (meth)acrylate/maleic anhydride copolymers comprise from 0.2 to 10% by weight of maleic anhydride and up to 40% and preferably 5 to 40% by weight of alkyl (meth)acrylate. Their MFIs are between 2 and 100 g/10 min. (190° C./2.16 kg). The term "alkyl (meth)acrylate" advantageously denotes $C_1$ to $C_8$ alkyl acrylates and methacrylates and may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

The melting point is between 80 and 120° C. These copolymers are commercially available. They are produced by radical polymerization at a pressure that may be between 200 and 2500 bar.

By way of example, it is also possible to use the following blends (in % by weight):
1)
55 to 70% of PA-6,
5 to 15% of an ethylene/propylene copolymer containing predominantly propylene, grafted with maleic anhydride and then condensed with monoaminated caprolactam oligomers,
the balance to 100% of polypropylene;
2)
55 to 70% of PA-6,
5 to 15% of at least one copolymer of ethylene with (i) an alkyl (meth)acrylate or a vinyl ester of an unsaturated carboxylic acid and (ii) an unsaturated carboxylic acid anhydride or an unsaturated epoxide, which is grated or copolymerized,
the balance of polyethylene;

3)
55 to 70% of PA-6,
5 to 15% of polyethylene or copolymers of ethylene with an alpha-olefin, grafted with maleic anhydride or glycidyl methacrylate,
the balance of high-density polyethylene.

With regard to the layer (2a) formed from EVOH copolymer, this may consist of EVOH or of an EVOH-based blend. EVOH is also referred to as a saponified ethylene/vinyl acetate copolymer. The saponified ethylene/vinyl acetate copolymer to be used according to the present invention is a copolymer having an ethylene content of 20 to 70 mol %, preferably 25 to 70 mol %, the degree of saponification of its vinyl acetate component not being less than 95 mol %. With an ethylene content of less than 20 mol %, the barrier properties under high-humidity conditions are not as high as would be desired, whereas an ethylene content exceeding 70 mol % results in reduced barrier properties. When the degree of saponification or hydrolysis is less than 95 mol %, the barrier properties are sacrificed.

The expression "barrier properties" is understood to mean the impermeability to gases and liquids, and in particular to oxygen and to petrol for motor vehicles.

Among these saponified copolymers, those which have melt flow indices within the 0.5 to 100 g/10 min. range are particularly useful. Advantageously, the MFI is chosen between 5 and 30 g/10 min. (at 230° C./2.16 kg), "MFI" is the abbreviation for "Melt Flow Index".

It is known that this saponified copolymer may contain small amounts of other comonomer ingredients, including α-olefins, such as propylene, isobutene, α-octene, α-dodecene, α-octadecene, etc., unsaturated carboxylic acids or their salts, partial alkyl esters, complete alkyl esters, nitrites, amides and anhydrides of the said acids, and unsaturated sulphonic acids and salts thereof.

As regards the EVOH-based blends, these are such that the EVOH forms the matrix, that is to say it represents at least 40% and preferably at least 50% by weight of the blend. The other constituents of the blend are chosen from polyolefins, polyamides and possibly functional polymers.

As a first example of these EVOH-based blends, mention may be made of the following compositions (by weight):
55 to 99.5 parts of EVOH copolymer;
0.5 to 45 parts of polypropylene and compatibilizer, their proportions being such that the ratio of the amount of polypropylene to the amount of compatibilizer is between 1 and 5.

Advantageously, the ratio of the MFI of the EVOH to the MFI of the polypropylene is greater than 5 and preferably between 5 and 25. Advantageously, the MFI of the polypropylene is between 0.5 and 3 (in g/10 min. at 230° C./2.16 kg). According to an advantageous embodiment, the compatibilizer is a polyethylene carrying grafted polyamide species and it results from the reaction of (i) a copolymer of ethylene and a grafted or copolymerized unsaturated monomer X with (ii) a polyamide. The copolymer of ethylene and a grafted or copolymerized unsaturated monomer X is such that X is copolymerized and it may be chosen from ethylene/maleic anhydride copolymers and ethylene/alkyl (meth) acrylate/maleic anhydride copolymers, these copolymers comprising from 0.2 to 10% by weight maleic anhydride and from 0 to 40% by weight alkyl (meth)acrylate. According to another advantageous embodiment, the compatibilizer is a polypropylene carrying grafted polyamide species which result from the reaction of (i) a propylene homopolymer or a propylene copolymer comprising a grafted or copolymerized, unsaturated monomer X with (ii) a polyamide. Advantageously, X is grafted. The monomer X is advantageously an unsaturated carboxylic acid anhydride such as, for example, maleic anhydride.

As a second example of these EVOH-based blends, mention may be made of the compositions comprising:
50 to 98% by weight of an EVOH copolymer;
1 to 50% by weight of a polyethylene;
1 to 15% by weight of a compatibilizer consisting of a blend of an LLDPE or metallocene polyethylene and a polymer chosen from elastomers, very low-density polyethylenes and metallocene polyethylenes, the blend being cografted by an unsaturated carboxylic acid or a functional derivative of this acid.

Advantageously, the compatibilizer is such that the $MFI_{10}/MFI_2$ ratio is between 5 and 20, where $MFI_2$ is the melt flow index at 190° C. with a load of 2.16 kg, measured according to ASTM D1238, and $MFI_{10}$ is the melt flow index at 190° C. with a load of 10 kg according to ASTM D1238.

As a third example of these EVOH-based blends, mention may be made of the compositions comprising:
50 to 98% by weight of an EVOH copolymer;
1 to 50% by weight of an ethylene/alkyl (meth) acrylate copolymer;
1 to 15% by weight of a compatibilizer resulting from the reaction of (i) a copolymer of ethylene and a grafted or copolymerized unsaturated monomer X with (ii) a copolyamide.

Advantageously, the copolymer of ethylene and a grafted or copolymerized unsaturated monomer X is such that X is copolymerized, and it is an ethylene/maleic anhydride copolymer or an ethylene/alkyl (meth)acrylate/maleic anhydride copolymer. Advantageously, these copolymers comprise from 0.2 to 10% by weight of maleic anhydride and from 0 to 40% by weight of alkyl (meth)acrylate.

With regard to the layer (3) made of a polyamide P3, <<polyamide>> is understood to mean within the context of the present invention polyamides or PAs which contain aliphatic and/or cycloaliphatic and/or aromatic units.

Advantageously, nylon-11 or nylon-12 is used. Advantageously, the polyamide of the outer layer is plasticized by standard plasticizers such as n-butyl benzene sulphonamide (BBSA) and polymers comprising polyamide blocks and polyether blocks. These block polymers result from the condensation of polyamide blocks having carboxylic end groups with either polyetherdiols or polyetherdiamines, or a blend of these polyethers. This outer layer may also contain antioxidants and standard fillers such as carbon black. In general, the plasticizers of the polyamide-block and polyether-block type, which may be added to the outer layer, are those described in Patent Application FR 94/14521.

With regard to the layer (2) formed from a blend of PA-6/12 copolyamides, one comprising by weight more 6 than 12 and the other more 12 than 6, the PA-6/12 copolyamide results from the condensation of caprolactam with lauryllactam. It is clear that "6" denotes the units derived from caprolactam and "12" denotes the units derived from lauryllactam. It would not be outside the scope of the invention if caprolactam were to be replaced entirely or partly with aminocaproic acid, and likewise lauryllactam could be replaced with aminododecanoic acid. These copolyamides may include other units, provided that the ratio of the 6 and 12 proportions are respected.

Advantageously, the copolyamide containing more 6 comprises 52 to 90% by weight of 6 for 48 to 10% of 12, respectively.

Preferably, the copolyamide containing more 6 comprises 55 to 90% by weight of 6 for 45 to 10% of 12, respectively.

More preferably, the copolyamide containing more 6 comprises 55 to 70% by weight of 6 for 45 to 30% of 12, respectively.

Most preferably, the copolyamide containing more 6 comprises 60 to 90% by weight of 6 for 40 to 10% of 12, respectively.

Advantageously. the copolyamide containing more 12 comprises 52 to 90% by weight of 12 for 48 to 10% of 6, respectively.

Preferably, the copolyamide containing more 12 comprises 55 to 90% by weight of 12 for 45 to 10% of 6, respectively.

More preferably, the copolyamide containing more 12 comprises 55 to 70% by weight of 12 for 45 to 30% of 6, respectively.

More preferably, the copolyamide containing more 12 comprises 60 to 90% by weight of 12 for 40 to 10% of 6, respectively.

As regards the proportions of the copolyamide rich in 6 and of the copolyamide rich in 12, these may be, by weight, from 40/60 to 60/40 and preferably 50/50.

These copolyamide blends may also include up to 30 parts by weight of other grafted polyolefins or (co)polyamides per 100 parts of copolyamides rich in 6 and rich in 12.

These copolyamides have a melting point (DIN 53736B standard) of between 60 and 200° C. and their relative solution viscosity may be between 1.3 and 2.2 (DIN 53727 standard; m-cresol solvent, 0.5 g/100 ml concentration, 25° C. temperature, Ubbelohde viscometer). Their melt rheology is preferably similar to that of the materials of the adjacent layers. These products are manufactured by the standard techniques for polyamides. Processes are described in patents U.S. Pat. Nos. 4,424,864, 4,483,975, 4,774,139, 5,459,230, 5,489,667, 5,750,232 and 5,254,641.

The invention also relates to tubes consisting of these structures; the layer (1) or (1a) is placed on the inside of the tube. The tubes of the invention may be produced by coextrusion.

These tubes, intended to take petrol from the tank to the engine of motor vehicles, have an external diameter generally ranging from 6 to 12 mm and their thickness varies in general from 0.8 to 2 mm. The layer 1 has a thickness in general of at least 50 µm and preferably 100 to 500 µm.

The layer 1a filled with electrically conducting carbon black has a thickness in general ranging from 25 to 300 µm and preferably from 50 to 150 µm.

The layer 2 of the copolyamide blend has a thickness in general of at least 10 µm and preferably 20 to 100 µm.

The EVOH layer 2a has a thickness of 10 to 200 µm.

The layer 3 has a thickness in general of at least 300 µm and preferably 400 to 800 µm.

These multilayer tubes may be cylindrical, with a constant diameter, or corrugated.

Conventionally, these tubes may include protective sheaths, especially made of rubber, in order to protect them from engine hot spots.

The entire disclosure[s] of all applicants, patents and publications, cited herein and of corresponding French application No. 02.01039, filed Jan. 29, 2002, and U.S. Provisional Application Ser. No. 60/358,388, filed Feb. 22, 2002, are incorporated by reference herein.

The invention claimed is:

1. A polyamide-based multilayer structure comprising:
  a first layer (1) comprising a polyamide $P_1$ or a blend of a polyamide $P_1$ and a polyolefin $PO_1$ having a $P_1$ polyamide matrix,
  optionally, a layer (2a) comprising EVOH;
  a layer (2) comprising a blend of a first PA-6/12 copolyamide, containing more PA-6 by weight than PA-12 and a second PA-6/12 copolyamide containing more PA-12 by weight than PA-6; and
  a layer (3) comprising a polyamide $P_3$, $P_1$ and $P_3$ being identical or different, layers (1), (2), (2a) and (3) being successive and adhering to one another in their respective contact regions.

2. The structure according to claim 1, in which the first layer (1) is a layer (1a), comprising a-polyamide $P_1$a or a blend of a polyamide $P_1$a and a polyolefin $PO_1$a having a polyamide matrix and containing electrically conducting carbon black producing a surface resistivity of less than $10^6$ $\Omega/\square$.

3. The structure according to claim 2, in which the polyamide $P_1$ a is nylon-6, nylon-6,6 or nylon-12.

4. The structure according to claim 1, comprising an additional layer (1a) placed on the layer (1) side, layers (1) and (1a) adhering to each other in their respective contact region, layer (1a) comprising a polyamide $P_1$ a or a blend of a polyamide $P_1$a and a polyolefin $PO_1$a having a polyamide matrix and containing electrically conducting carbon black producing a surface resistivity of less than $10^6$ $\Omega/\square$.

5. The structure according to claim 4, in which the polyamide $P_1$ or $P_1$a is nylon-6, nylon-6,6 or nylon-12.

6. The structure according to claim 1, in which the polyamide $P_1$ is nylon-6, nylon-6,6 or nylon-12.

7. The structure according to claim 1, in which the polyolefin $PO_1$ is:
  polyethylene;
  polypropylene;
  an ethylene/alpha-olefin copolymer;
  an ethylene/alkyl (meth)acrylate copolymer;
  an ethylene/alkyl (meth)acrylate/maleic anhydride copolymer, the maleic anhydride being grafted or copolymerized; or
  an ethylene/alkyl (meth)acrylate/glycidyl methacrylate copolymer, the glycidyl methacrylate being grafted or copolymerized.

8. The structure according to claim 1, in which the polyamide $P_3$ is a PA-11 or PA-12 polyamide.

9. The structure according to claim 1, in which the copolyamide containing more PA-6 in layer (2) comprises 52 to 90% by weight of PA-6 for 48 to 10% of PA-12, respectively.

10. The structure according to claim 1, in which the copolyamide containing more PA-6 in layer (2) comprises 60 to 90% by weight of PA-6 for 40 to 10% of PA-12, respectively.

11. The structure according to claim 1, in which the copolyamide containing more PA-12 in layer (2) comprises 52 to 90% by weight of PA-12 for 40 to 10% of PA-6, respectively.

12. The structure according to claim 1, in which the copolyamide containing more PA-12 in layer (2) comprises 60 to 90% by weight of PA-12 for 40 to 10% of PA-6, respectively.

13. The structure according to claim 1, having a proportion of the copolyamide containing more PA-6 and of the copolyamide containing more PA-12 in layer (2) of 40/60 to 60/40 by weight.

14. A tube containing a structure according to claim 1, having an inside layer (1) or (1a) and an outside layer (3).

15. A polyamide blend comprising a blend of a first PA-6,12 copolyamide, having more PA-6 by weight than PA-12 and a second PA-6, 12 copolyamide having more PA-12 by weight than PA-6.

16. The polyamide blend according to claim 15, further comprising PA-12 and at least one of PA-6 or PA-6,6.

17. The polyamide blend according to claim 15, wherein the first copolyamide comprises 52 to 90% by weight of PA-6 for 48 to 10% of PA-12 respectively.

18. The polyamide blend according to claim 15, wherein the second copolyamide comprises 52 to 90% by weight of PA-12 for 48 to 10% of PA-6 respectively.

19. The polyamide blend according to claim 15, wherein the first copolyamide comprises 60 to 90% by weight of PA 6 for 40 to 10% of PA-12 respectively.

20. The polyamide blend according to claim 15, wherein the second copolyamide comprises 60 to 90% by weight of PA-12 for 40 to 10% of PA-6 respectively.

* * * * *